United States Patent [19]

Hirano

[11] 4,336,853
[45] Jun. 29, 1982

[54] COMBINATION WEIGHING DEVICE

[75] Inventor: Takashi Hirano, Kobe, Japan

[73] Assignee: Yamato Scale Company, Ltd., Hyogo, Japan

[21] Appl. No.: 218,850

[22] Filed: Dec. 22, 1980

[30] Foreign Application Priority Data

Dec. 24, 1979 [JP] Japan ............................... 54-168818

[51] Int. Cl.³ .......................... G01G 19/04; B07C 5/16
[52] U.S. Cl. ........................................ 177/25; 209/592
[58] Field of Search ............................ 177/1, 25, 145; 209/592-596

[56] References Cited

U.S. PATENT DOCUMENTS 2,802,658  8/1957  Hensgen et al. ........................ 177/1
3,708,025  1/1973  Soler et al. ............................. 177/1
3,939,928  2/1976  Murakami et al. ................. 177/1 X Primary Examiner—George H. Miller, Jr.
Attorney, Agent, or Firm—Eugene E. Geoffrey, Jr.

[57] ABSTRACT

A combination weighing device, which is typically used for packing a plurality of solid articles in each bag or the like, including a plurality of weighing balances for weighing a plurality of articles each at the same time, and arithmetic means for selecting some of these wieghing balances so that the total weight of the articles thereon falls within a predetermined allowable range, the device also including means for checking the number of these selected articles to make them fall within a predetermined allowable range and collecting these articles in a pack or bag so that each pack contains substantially constant weight and number of articles.

4 Claims, 1 Drawing Figure

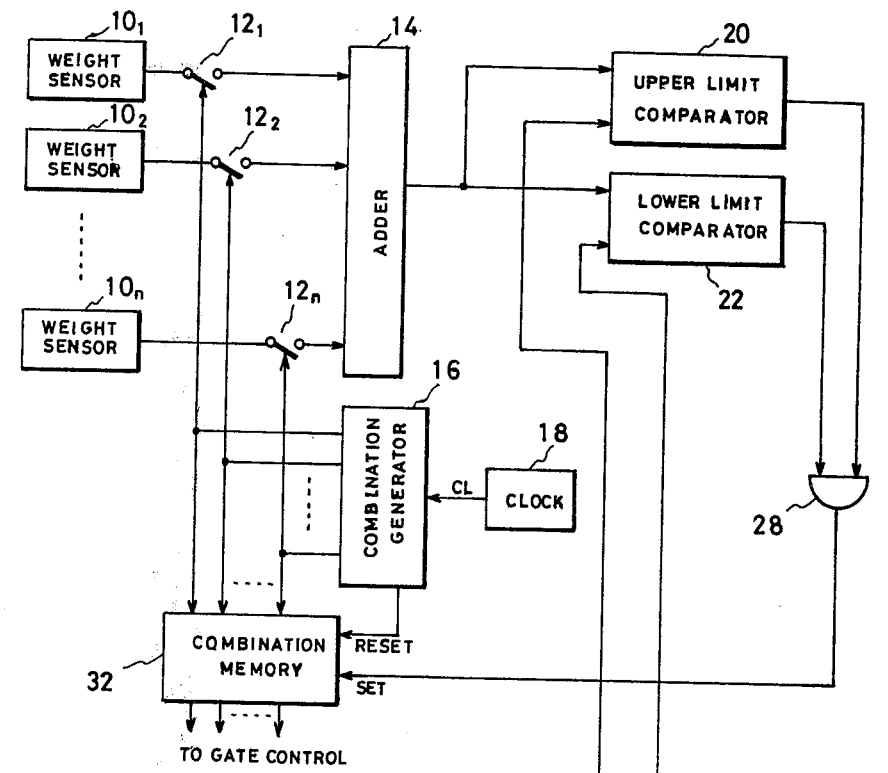
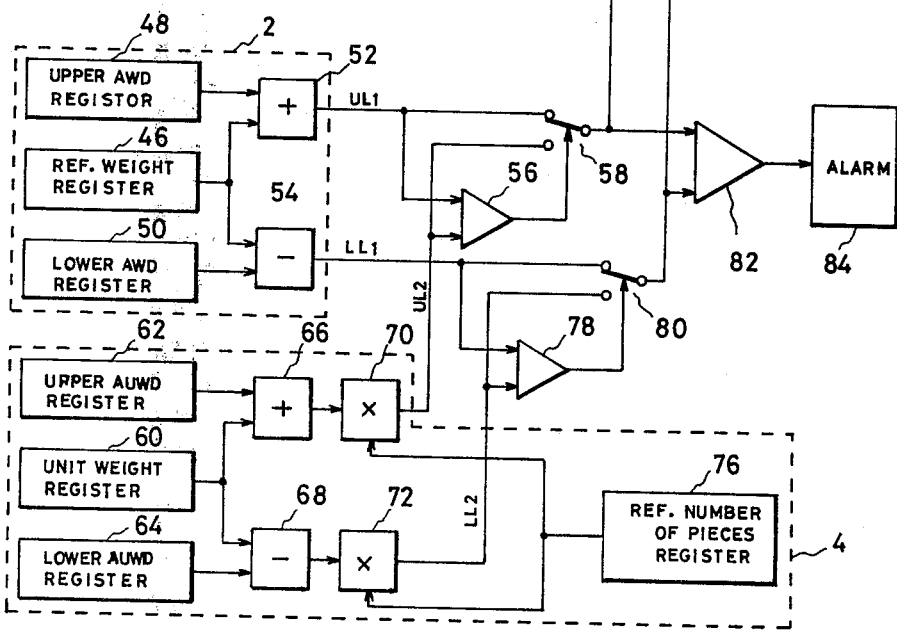

COMBINATION WEIGHING DEVICE

This invention relates to an improved combination weighing device, particularly to a device for use in the case wherein a plurality of articles are packed together so that each pack contains nearly constant weight and number of articles.

The weighing device which is generally referred to as a "combination weighing device" or "combination balance" is used for extracting and collecting a plurality of articles from a group of articles, such as cakes, fish and vegetables, having relatively large variances in respective weights, so that the extracted group has a total weight which is nearly equal to a predetermined intended weight which will be hereinunder referred to as "reference weight." A typical example of such device is disclosed in U.S. Pat. No. 3,939,928, and another example which is improved over this United States patent in arithmetic arrangement is described in the pending U.S. Pat. Application Ser. No. 102,660 filed Dec. 12, 1979. In these devices, a plurality of articles are weighed individually by each of a plurality of weighing balances at the same time. All mathematical combinations of the respective measured weights are summed up respectively and the summed weights are compared with predetermined allowable upper and lower limits. When the sum falls between both limits, the articles on the weighing balances forming the combination at that time are collected in a pack, thereby rendering each pack with a substantially constant weight of articles.

In such prior art combination weighing devices, however, there is a possibility of occurrence of differences in the number of articles in respective packs, especially when there is a substantial variation in the weights of individual articles. In the case of purchasing merchandise, the customer may tend to select a pack taking the number of articles contained therein into consideration, even if the weight of each pack is substantially uniform. Therefore, it is sometimes more important to control the number of articles in each pack, rather than maintaining the weight constant. Consequently, it is often desirable to pack articles so that each pack contains not only constant weight but also a constant number of articles.

In the co-pending application, there is disclosed a novel combination weighing device which includes means for detecting the number of articles carried on each weighing balance, summing up these numbers at the same time as summing up the corresponding weights of articles as in the prior art devices, and comparing the resultant total number with a predetermined reference number. Thus, the command signals for unloading the selected weighing balances are produced only when the total weight and the total number of the articles on these balances both fall within predetermined allowances. Although such a device can control the total number of articles very precisely, it is significantly expensive due to installation of a costly number detection units.

Accordingly, an object of this invention is to provide an improved combination weighing device which can select a combination of weighing balances every cycle of operation so that the total weight and total number of articles on these balances fall within predetermined ranges, respectively.

According to this invention, the total weight of the articles carried on the selected weighing balances is checked with respect to an allowable weight range which is automatically calculated from the unit weight tolerance and a predetermined intended number of articles in a pack.

The combination weighing device according to the abovementioned principle of this invention includes a plurality of weighing balances for weighing a plurality of articles to produce weight signals respectively, means for coupling the weight signals through individual normally-open switches to a common adder circuit which sums up the incoming weight signals to produce a sum signal, switch control means for providing control signals to the normally-open switches to close them in accordance with a predetermined set of combinations in turn, and means responsive to a command signal to store a current combination of the control signals and utilizing them to control loading and unloading of the selected balances. The device further includes first means for providing upper and lower limits of an allowable weight range established on the basis of the intended total weight, second means for providing another pair of upper and lower limits of an allowable weight range calculated on the basis of the intended total number of articles, means for comparing the two pairs of upper and lower limits with each other to select a new pair of upper and lower limits which provide similar weight deviations, upper and lower limit comparators for comparing respectively the selected upper and lower limits with the sum signals to produce individual outputs when the sum falls within each limit, and means for producing the command signal in response to the presence of both outputs of the upper and lower limit comparators.

Other objects and features of this invention will be described in more detail hereinunder with reference to the accompanying drawing.

The single drawing shows in block form an embodiment of the combination weighing device according to this invention.

Referring to the drawing, the combination weighing device, includes a plurality of weight sensors $10_1$, $10_2$, . . . $10_n$, such as load cells, for sensing the weights of articles carried on a plurality of corresponding weighing balances (not shown), respectively, to produce weight signals indicative of the respective weights. These weight signals are coupled respectively through normally-open switches $12_1$, $12_2$, . . . $12_n$, each having a control input, to an adder circuit 14 which sums up the weight signals supplied thereto to produce a sum output. The control terminal of each normally-open switch 12 is coupled to a corresponding one of n-number of output terminals of a combination generator 16. The combination generator 16 is driven by clock pulses CL from a clock pulse generator 18 to produce a predetermined set of combinations of output signals from its selected output terminals in clocked fashion. For example, if the predetermined set of combinations are complete mathematical combinations of the n-number of outputs, the combination generator 16 may be an n-bit binary counter having a control input coupled to the clock pulse generator 18 and n-number of parallel outputs coupled respectively to the output terminals. In this case, the logic "high" level of binary "1" serves as the "output" signal from each output terminal of the combination generator 16. As widely known by those skilled in the art, the total number of such combination is $2^n - 1$ and the combination generator 16 produces $(2^n-1)$ sets of output signals in turn in synchronism with the applied clock pulses CL.

The sum output of the adder circuit 14 is applied to one input of each of the upper and lower limit comparators 20 and 22, the other inputs of which are supplied from an allowable range presetting unit as described later. The outputs of these comparators 20 and 22 are coupled to an AND gate 28 having an output applied as a set input to a combination memory 32.

The combination memory 32 has a plurality (n-number) of input terminals coupled respectively to the corresponding output terminals of the combination generator 16, and the same number of corresponding output terminals coupled respectively to gate control units (not shown) associated with the corresponding weighing balances (not shown). The combination memory 32 serves to store a set of incoming signals in response to the set input from the AND gate 28 and discharge then from the corresponding output terminals in response to a reset signal applied from the combination generator 16 at the end of each combination cycle, thereby controlling unloading and subsequent loading operations of the corresponding balances. The combination memory can be designed optionally by those skilled in the art and will not be described further.

The lower half of the drawing shows the aforementioned allowable range presetting unit for providing upper and lower limit signals to be applied to the second inputs of the comparators 20 and 22, respectively. The unit includes first and second range generators 2 and 4 as shown by dashed blocks. The first range generator 2 is of a prior art type and includes a reference weight register 46 and upper and lower allowable weight deviation (AWD) registers 48 and 50. These registers may be of conventional type having an input device such as digital keyboard, and a predetermined reference weight of one pack and allowable upper and lower deviations thereof are stored previously therein, respectively. The contents of the registers 46 and 48 are summed up by an adder circuit 52 to produce an upper limit signal UL1 and the contents of the register 50 is subtracted from the content of the register 46 by a subtractor 54 to produce a lower limit signal LL1.

The second range generator 4 is provided as a feature of this invention and includes a unit weight register 60 and upper and lower allowable unit weight deviation (AUWD) registers 62 and 64, which are similar in structure to the registers 46, 48 and 50, and a predetermined reference or average weight of the articles and allowable upper and lower deviations therefrom are previously stored therein, respectively. The device 4 further includes a reference number-of-pieces register 76 having a similar structure to the above registers and storing previously a predetermined number of articles in one pack. The output of the registers 60 and 62 are summed up by the adder 66 to produce an output indicative of the upper limit of the allowable range of weight of each article, and the content of the register 64 is subtracted from the content of the register 60 by a subtractor 68 to produce an output indicative of the lower limit of the allowable range of weight of each article. The outputs of the adder 66 and subtractor 68 are multiplied by the content of the register 76 by multiplier 70 and 72, respectively, which produce outputs UL2 and LL2 respectively indicative of the upper and lower limits of the allowable range of weight of one pack, which have been derived on account of the total number of articles in one pack.

The upper limit signals UL1 and UL2 are coupled to a first comparator 56 and to two fixed contacts of a single-pole double-throw switch 58, while the lower limit signals LL1 and LL2 are coupled to a second comparator 78 and to two fixed contacts of another single-pole double-throw switch 80. The comparators 56 and 78 have their outputs coupled to control terminals of the switches 58 and 80 and are arranged to cooperate with the switches 58 and 80 such that lower one of the inputs of the switch 58 is transferred to the upper limit comparator 20 and higher one of the inputs of the switch 80 is transferred to the lower limit comparator 22. In other words, the comparators 56 and 78 and the switches 58 and 80 are arranged to provide the comparators 20 and 22 with severe ones of the upper and lower limits produced by the range generators 2 and 4.

The outputs of the switches 58 and 80 are also coupled to the inputs of a third comparator 82 having an output coupled to an alarm device. The comparator 82 is arranged to produce an output to actuate the alarm device when the output of the switch 80 is greater than the output of the switch 58 so as to avoid such an accident that the lower limit is higher than the upper limit.

Although the above description was made in conjunction with a specific embodiment, it is to be understood that this invention is not limited to the details thereof but various modifications and changes can be made without departing from the scope of this invention.

What is claimed is:

1. A combination weighing device, comprising a plurality of weighing balances for weighing a plurality of articles each to produce corresponding weight signals, respectively, an adder circuit for summing up incoming signals to produce a sum signal, means for coupling said weight signals to said adder circuit through individual normally-open switches each having a control input, means coupled to said control inputs for closing said switches selectively in accordance with a predetermined set of combinations thereof, first means for providing predetermined first upper and lower limits of an allowable range of the total weight of articles, means for comparing said sum signal with an incoming allowable range to produce a command signal when the sum falls within said range, and means responsive to said command signal for storing a current combination for utilization, second means for providing predetermined second upper and lower limits of an allowable range of the unit weight of said articles, means for providing a predetermined total number of articles, multiplier means for multiplying said second upper and lower limits by said total number to produce third upper and lower limits, respectively, means for comparing said first and third upper and lower limits with each other and applying the severe ones of said upper and lower limits to said command signal producing and comparing means as the upper and lower limits of said allowable range.

2. A combination weighing device, according to claim 1, characterized in that said means for comparing the first and third upper and lower limits comprise a first comparator for receiving at its inputs said first and third upper limits, a second comparator for receiving at its inputs said first and third lower limits, a first single-pole double-throw switch having a pair of fixed contacts coupled for receiving said first and third upper limits respectively, a movable contact coupled to one output terminal and means for controlling said movable contact, a second single-pole double-throw switch having a pair of fixed contacts coupled for receiving said first and third lower limits, a movable contact coupled to another output terminal and means for controlling said movable contact, said both output terminals being coupled to said command signal producing and comparing means, the output of said first comparator being coupled to said movable contact control means of said first single-pole double-throw switch to control said movable contact to come in a contact with one of said fixed contacts, which receives the severe one of said first and third upper limits, and the output of said second comparator being coupled to said movable contact control means of said second single-pole doublethrow switch to control said movable contact to come into contact with one of said fixed contacts, which receives the severe one of said first and third lower limits.

3. A combination weighing device, according to claim 1, characterized in that said second means comprises a first register for storing the predetermined unit weight of said articles, second and third registers for storing predetermined allowable upper and lower deviations from said unit weight, respectively, an adder circuit for summing up the contents of said first and second registers to produce said second upper limit, and a subtractor circuit for subtracting the content of said third register from the content of said first register to produce said second lower limit.

4. A combination weighing device, according to claim 3, wherein a third comparator having inputs is coupled to said output terminals for producing an output when the upper limit output is lower than the lower limit output, and an alarm device coupled to the output of said third comparator to produce an alarm signal in response to the output of said comparator.

* * * * *

UNITED STATES PATENT OFFICE
CERTIFICATE OF CORRECTION

Patent No. 4,336,853                    Dated  June 29, 1982

Inventor(s)  Takashi Hirano

It is certified that error appears in the above-identified patent and that said Letters Patent are hereby corrected as shown below:

Column 4, line 15, the word "severe" should be --several--

Claim 1, column 4, line 55, the word "severe" should be --several--

Claim 2, column 5, lines 11 and 17, the words "severe one" should be --several ones--

Signed and Sealed this

Nineteenth Day of April 1983

[SEAL]

Attest:

GERALD J. MOSSINGHOFF

Attesting Officer         Commissioner of Patents and Trademarks